United States Patent [19]
Barrows et al.

[11] Patent Number: 5,547,725
[45] Date of Patent: Aug. 20, 1996

[54] PRODUCTION OF A NOVEL SCULPTURED STRIP OF PLASTIC FOAM

[75] Inventors: Lawrence Barrows, Wayland; Gerald Lowden, Lowell, both of Mich.; Carmen Cassetta; Yehuda Ozari, both of Charlotte, N.C.

[73] Assignee: tesa tape inc., Charlotte, N.C.

[21] Appl. No.: 201,584

[22] Filed: Feb. 25, 1994

[51] Int. Cl.⁶ ..................................................... B32B 3/30
[52] U.S. Cl. ........................... 428/43; 428/137; 428/159; 428/317.3; 428/343; 428/906
[58] Field of Search ................................. 428/40, 42, 43, 428/137, 159, 172, 317.1, 317.3, 319.5, 343, 906

[56] References Cited

U.S. PATENT DOCUMENTS

| | | | |
|---|---|---|---|
| 1,960,137 | 5/1934 | Brown | 428/318.4 |
| 2,930,069 | 12/1975 | Stephens | 427/142 |
| 4,996,092 | 2/1991 | Francis et al. | 428/157 |
| 5,260,097 | 11/1993 | Silvestre | 427/282 |

FOREIGN PATENT DOCUMENTS

| | | |
|---|---|---|
| 0207720 | 6/1986 | European Pat. Off. . |
| 0249444 | 6/1987 | European Pat. Off. . |
| 0248652 | 6/1987 | European Pat. Off. . |
| 0256782 | 6/1987 | European Pat. Off. . |
| 0257872 | 8/1987 | European Pat. Off. . |
| 0262946 | 9/1987 | European Pat. Off. . |
| 0263637 | 9/1987 | European Pat. Off. . |
| 0303270 | 8/1988 | European Pat. Off. . |
| 0365510 | 9/1989 | European Pat. Off. . |
| 2362584 | 6/1975 | Germany . |
| 2611631 | 3/1976 | Germany . |
| 8607368 | 3/1986 | Germany . |
| 0885660 | 12/1961 | United Kingdom . |
| 1005547 | 9/1965 | United Kingdom . |

OTHER PUBLICATIONS

Karl Griesel, vol. 14, Jun. 1963, pp. 645–657.

Primary Examiner—Marion E. McCamish
Assistant Examiner—Blaine R. Copenheaver
Attorney, Agent, or Firm—Sprung Horn Kramer & Woods

[57] ABSTRACT

A foam article comprising a plurality of parallel foam strips, the foam strips being integral with and secured to adjacent strips by spaced short lengths, the spacing between successive securing lengths ranging from about 80 to 260 mm. The strips are in the form of a roll, the length of the securing lengths is from about 1 to 5 mm and the width of the strips is from about 6 to 25 mm. Advantageously the strips are elliptical in cross-section, formed of polyurethane and carry a light application of adhesive of one layer of the roll to the next.

14 Claims, 4 Drawing Sheets

PRODUCTION OF A NOVEL SCULPTURED STRIP OF PLASTIC FOAM

The present invention relates to the production of a novel-sculptured strip of plastic foam.

In U.S. Pat. No. 4,996,092, there is disclosed the preparation of a roll of contiguous-plastic-foam strips of sculptured contour. However, the strips must be made of cold-weldable material.

It is accordingly an object of the present invention to provide a simplified process for the preparation of one or more sculptured-plastic-foam strips of novel configuration, irrespective of whether the plastic foam is or is not cold weldable.

This and other objects of the invention are realized in accordance with the present invention, pursuant to which there is provided a foam article comprising a length of a plurality of parallel foam strips, the foam strips being integral with and secured to adjacent strips by spaced short lengths, the spacing between successive securing lengths ranging from about 80 to 260 mm, preferably about 100 to 200 mm and preferably about 125 mm. The length of such securing lengths can vary widely from about 0.8 to 8 mm, advantageously about 1 to 5 mm, and preferably about 2 or 3 mm.

It is even possible, but less preferred, to produce single elongated strips not laterally connected to one another.

The article is produced from a long flat sheet and/or rolls of plastic foam thicker than the desired height of the final strips. The initial sheet is passed under an array of cutting tools so that there are produced adjacent, parallel, connected foam strips of contoured configuration. A final cutter can completely sever adjacent strips, but preferably has one or more spaced notches in its periphery, so that there is no cutting between adjacent strips where the strips are encountered by the notches, thereby holding the strips together.

Where more than two strips are being produced, the lateral connections between the first and second strips are advantageously offset longitudinally relative to the lateral connections between the second and third strips, and so forth.

Preferably, the cross-sectional contour of the strips is curved, approximately semicircular, preferably elliptical. When intended for use as a protector in painting an automobile door, for example, the strips may range in width from about 6 to 25 and preferably from about 12 to 23 mm.

If desired, however, in cross-section the strips can be trapezoidal or of other cross section.

The foam sheet may be of any composition but advantageously does not undergo chemical change during processing, such as curing, so one knows that the final chemical composition is identical with the initial composition. Furthermore if of some stiffness it will facilitate cutting and ultimate use.

A preferred foam comprises a polyurethane, polyisocyanate, polyether or polyester of a density of about 1 to 6 and preferably about 1.5 to 2 pounds per cubic foot. Other foams, such as polyolefin, e.g. polymer or copolymer of ethylene, propylene, butylene, and the like, preferably polyethylene, can also be employed.

After contouring, there can be applied to one surface a thin film of adhesive which will serve multiple purposes. It will lightly hold together the turns of a strip when wound up or superimposed and, in use, will serve to adhere the strip, removably, to a surface such as an automobile door or body.

However, if desired, whether the adhesive film is present or not, each strip may optionally be lightly adhered by its adhesive film to a separator of glazed paper or plastic expressly to prevent adhesion between successive turns of adhesive-coated foam on a roll. Thus, in cross section, a roll will show successive loops of foam, adhesive, and separator. If no separator is present the successive turns of adherent foam will stick lightly and separably, to one another.

The strips may be in the form of a flat sheet up to 2 or preferably about 2.5m in length, but preferably they are in the form of a roll of 20 or 40 m or more in length.

The invention will now be further discussed with reference to the accompanying drawings, wherein.

Figure 1:
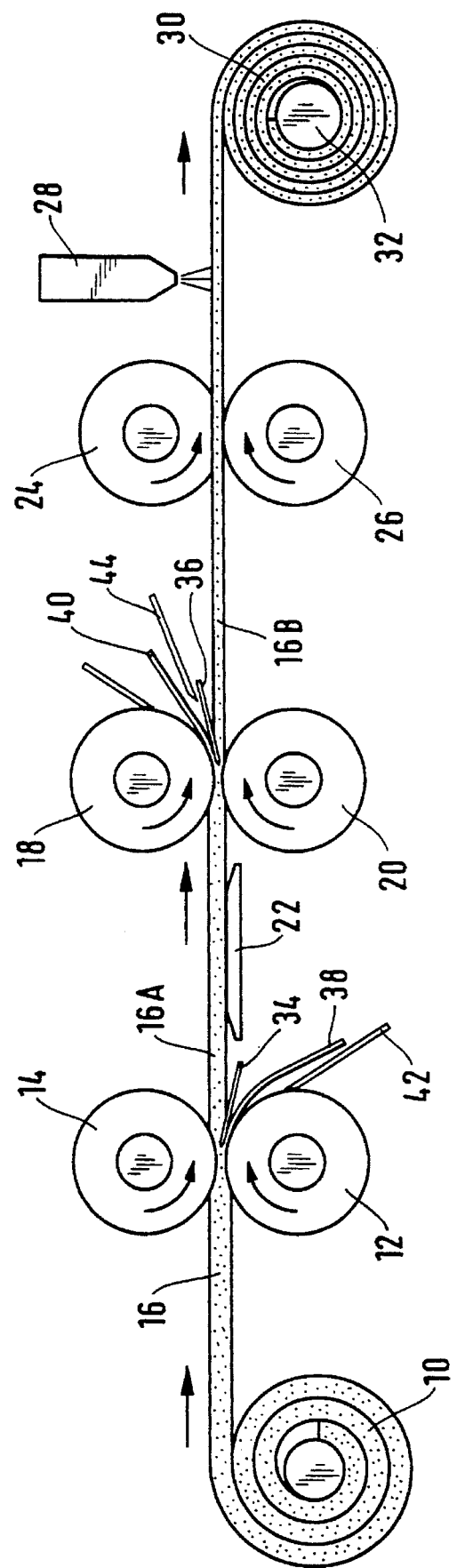
FIG. 1 is a flow sheet of a process in accordance with the present invention.

Referring now more particularly to FIG. 1 of the drawings, from a roll 10, there is pulled by a rotating anvil 12 and opposed shaped arbor 14 a foam sheet 16. A second anvil 18 and opposed shaped arbor 20, but this time switched in relative vertical positions, pulls the sheet 16 over a supporting table top 22. The sheet 16 leaving anvil-arbor 18–20 passes between rolls 24–26 described more fully hereinbelow, passes beneath applicator head 28 where a light adhesive coating is applied, and is then wound up as roll 30 on a rotating core 32, the adhesive from spray 28 serving lightly to adhere successive turns of the roll 30 to one another.

Saw blades 34 and 36 operate on the sheet 16 as it leaves successive nips between anvil and arbor, blade 34 operating on the underface of the sheet and blade 36 on the top. The blades are saw bands have cutting edges close to the nips and by movement in a plane perpendicular to the plane of FIG. 1 each cuts away material to be discarded, viz., scrap 38 and 40, using guides 42, 44 to keep each scrap line away from its anvil.

Figure 2:
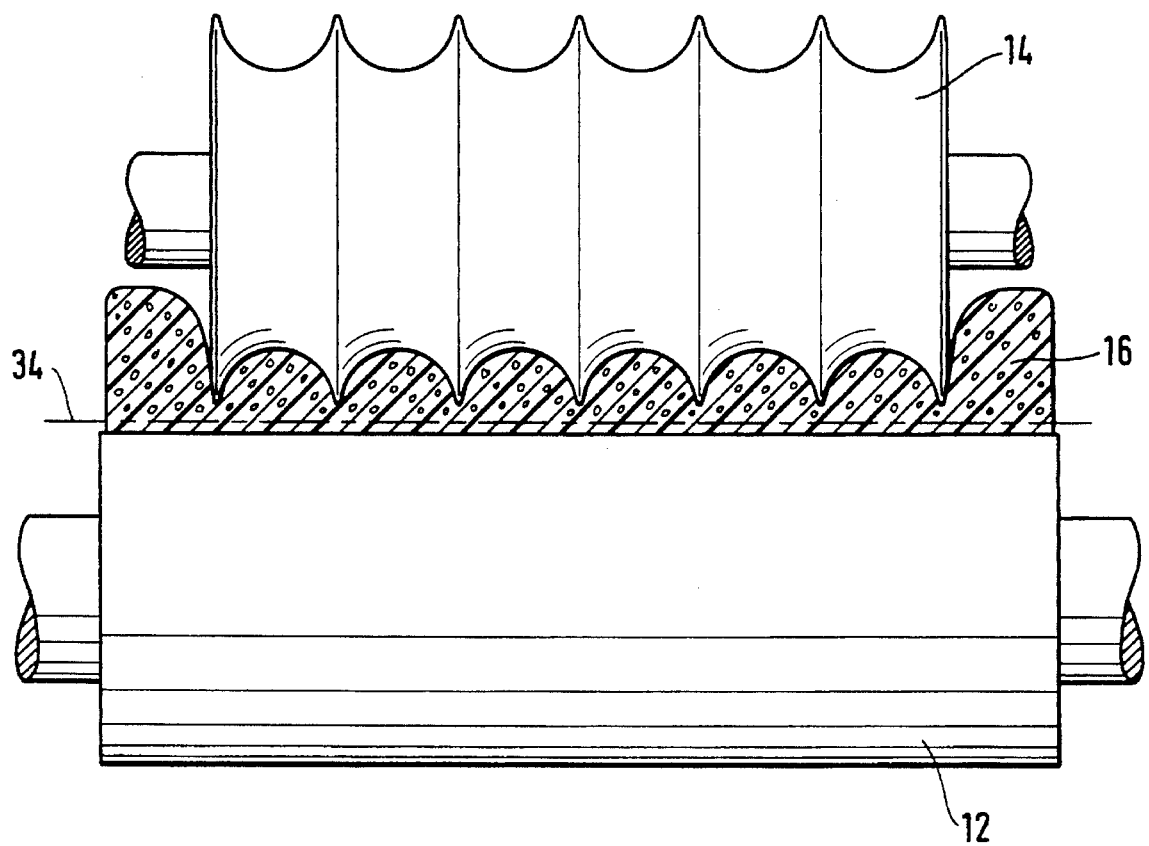
FIG. 2 is a front view of the first arbor and anvil of FIG. 1, with a foam sheet therebetween.
Figure 3:
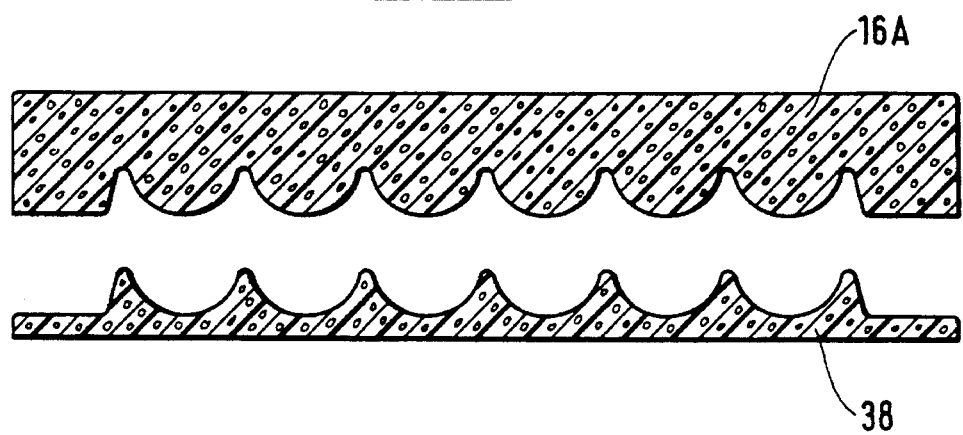
FIG. 3 is a front view of the sheet and scrap after cutting downstream of FIG. 2.

As seen in FIG. 2, when the sheet 16 moves between anvil 12 and arbor 14 it is compressed to the contour defined by the arbor, extremely compressed at the locations corresponding to the largest diameter of the arbor. Thus, for example, if the sheet is initially 1.2 inches thick, the difference in height from minimum to maximum diameter of the arbor is 0.4 inch and the sheet where maximally compressed is 0.2 inch thick, the blade 34 will be located to cut away scrap 38, leaving sheet 16 and scrap 38 as shown in FIG. 3. The maximum height of the scrap 38 is 0.2 inch, the now bottom-contoured sheet 16A 1 inch.

Figure 4:
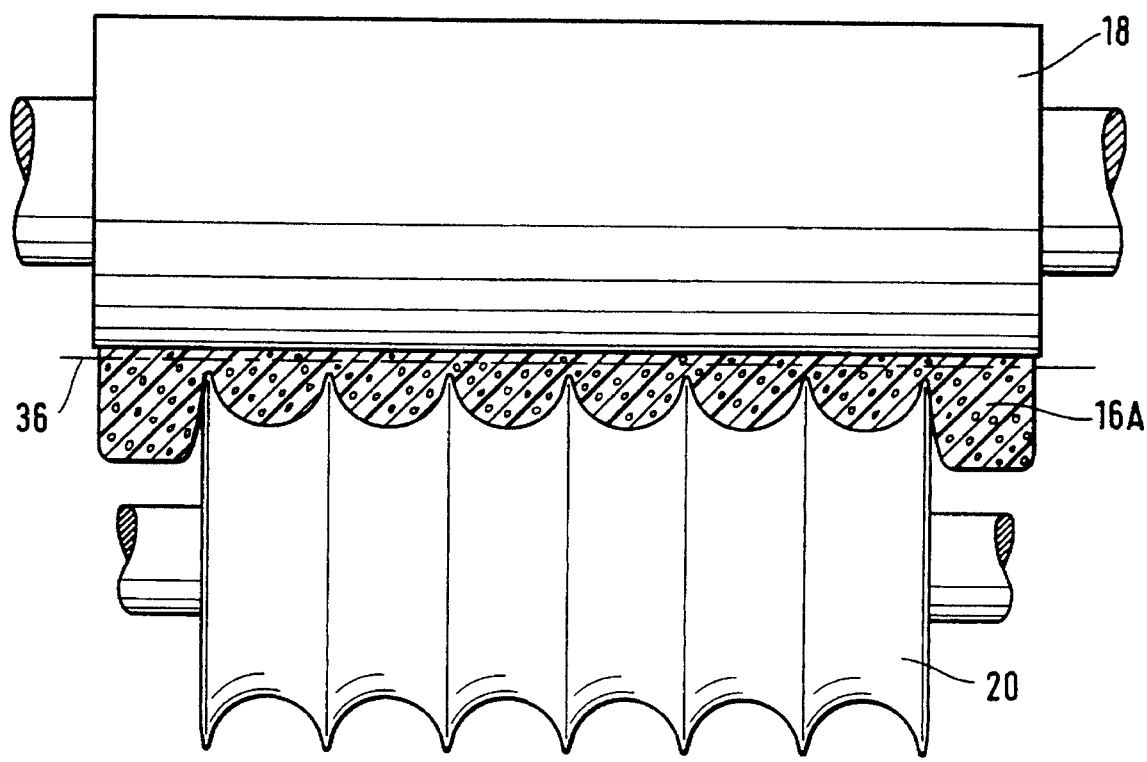
FIG. 4 is a front view of the second, downstream arbor and anvil of FIG. 1 with the foam sheet therebetween.
Figure 5:
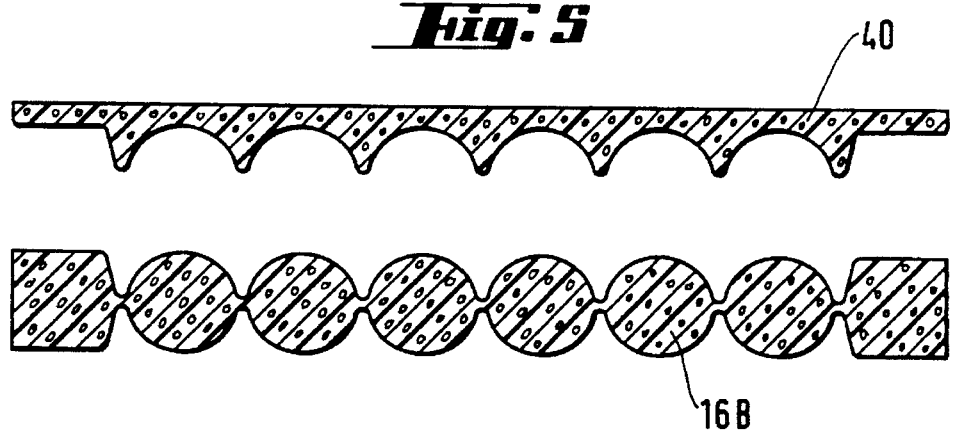
FIG. 5 is a front view of the sheet and scrap after cutting downstream of FIG. 4.

When the partially contoured sheet 16A enters the nip between anvil-arbor 18–20 as shown in FIG. 4 it is again compressed and again cut, as shown in FIG. 5, producing scrap 40 and sheet 16B which is now essentially a plurality of circular strips of about 0.7 inch in cross-section held together by a joinder line of about 0.1 inch.

Figure 6:
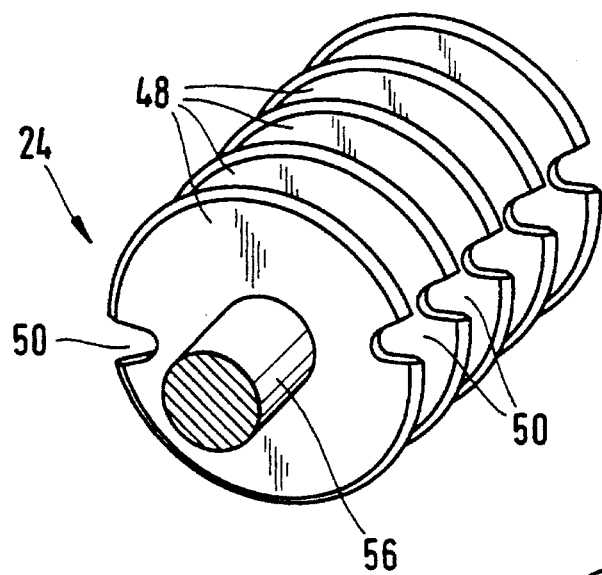
FIG. 6 is a lateral view of a set of notched blades for operating on the sheet.

Returning to FIG. 1, roll 26 is an anvil against which there operate a series of horizontally spaced rotating blades on a common shaft 24. Thus the blades sever the sheet 16B into a plurality of independent strips 46 of circular cross-section. However, as seen in FIG. 6, each blade 48 has at least one notch 50 which therefore fails to cut through the joinder between adjacent strips 46, leaving them connected at 52 along a length determined by the length of the notch and the diameter of the blade. The distance between notches determines the spacing between such joinders 52 and the length of the unjoined strips 54 therebetween.

The blades 48 along their shaft 24, more specifically 56, serve an additional purpose. They help position the sheet laterally along anvil 18 to ensure vertical registry between the cuts on the top and bottom of the sheet.

Figure 7:
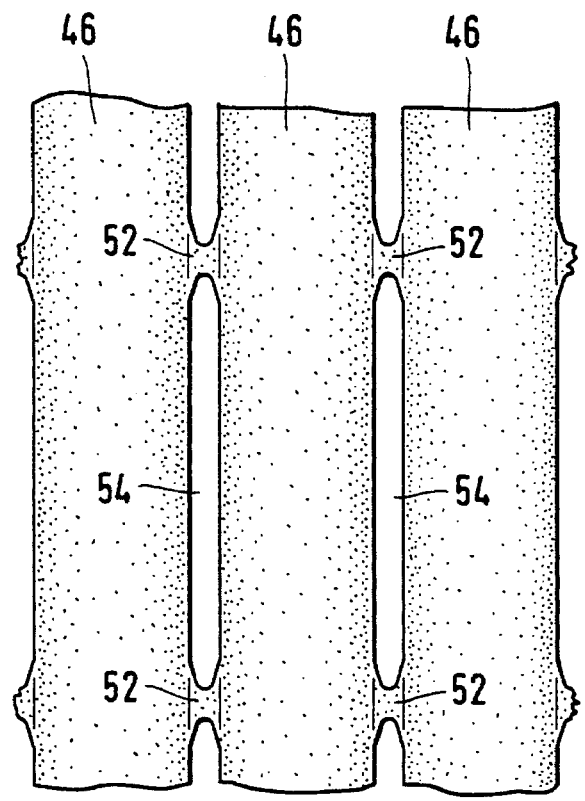
FIG. 7 is a plan view of a sheet of strips under some lateral extension to show the securing lengths between adjacent strips.

FIG. 7 shows in exaggerated form the joiners 52 and spacing 54 between joiners of adjacent strips 46.

Figure 8:
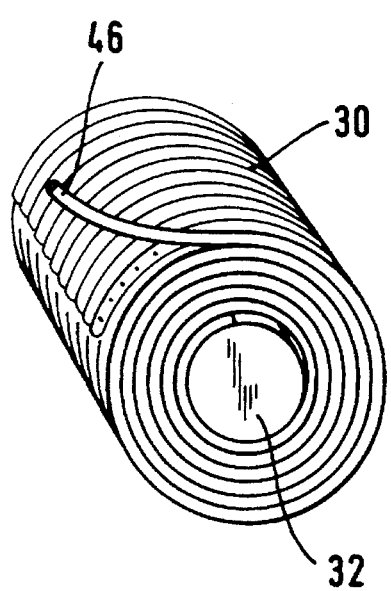
FIG. 8 is a perspective view of the roll of strips.

FIG. 8 is a perspective view of the roll 30 with one strip 46 shown pulled away. The joiners 52 are so short and light that single strips 46 may be pulled off the roll.

While the strips 46 are shown as approximately circular in cross-section, they can be oval or even substantially rectangular, determined by the shapes of the arbors. It is possible to have the top of a strand of one cross-section and the bottom of a different cross-section, the top and bottom each being contoured by a different arbor. It is even possible to omit one arbor and its anvil so the resulting product will be flat on one face; in such event the sole operating arbor is desirably positioned closer to its anvil.

It will be appreciated that the instant specification and claims are set forth by way of illustration and not limitation, and that various modifications and changes may be made without departing from the spirit and scope of the present invention.

What is claimed is:

1. A foam article comprising a foamed sheet having a top and a bottom, the sheet having a plurality of parallel longitudinal lines which extend through the entire foamed sheet to form a plurality of adjacent strips longitudinally connected to one another, said parallel longitudinal lines between adjacent strips being interrupted periodically so that adjacent strips are longitudinally connected to one another by integral compressed foam successive securing lengths at spaced locations up to about 260 mm, wherein said securing lengths permit adjacent strips to be pulled apart from the foam article.

2. An article according to claim 1, wherein the length of the successive lengths is from about 0.8 to 7 mm.

3. An article according to claim 1, wherein the parallel foam strips are in the form of a roll.

4. An article according to claim 1, wherein each parallel strip is curved in cross-section.

5. An article according to claim 1, wherein the foam strips are formed of polyolefin.

6. An article according to claim 1, wherein the foam strips are formed of polyurethane.

7. An article according to claim 1, including adhesive on the tops or bottoms of the foam strips.

8. An article according to claim 1, including adhesive on the bottoms of the foam strips.

9. An article according to claim 1, wherein the lateral connections between one strip and the strip on its left are longitudinally offset relative to the lateral connections between said one strip and the strip on its right.

10. An article according to claim 1, wherein each parallel strip is approximately elliptical in cross-section.

11. An article according to claim 10, wherein the parallel strips are in the form of a roll, wherein the spacing between successive securing lengths is up to 200 mm, the length of the successive securing lengths is from about 1 to 5 mm and the width of the strips is from about 6 to 25 mm.

12. An article according to claim 11, wherein the foam strips are formed of polyethylene, and including adhesive on the tops or bottoms of the foam strips.

13. A foam article according to claim 12 in the form of a roll, wherein the lateral connections between one strip and the strip on its left are longitudinally offset relative to the lateral connections between said one strip and the strip on its right.

14. An article according to claim 1, wherein the securing lengths are spaced from about 80 to 260 mm.

* * * * *